N. T. EDSON.
Hub.
No. 30,395
Patented Oct. 16, 1860.
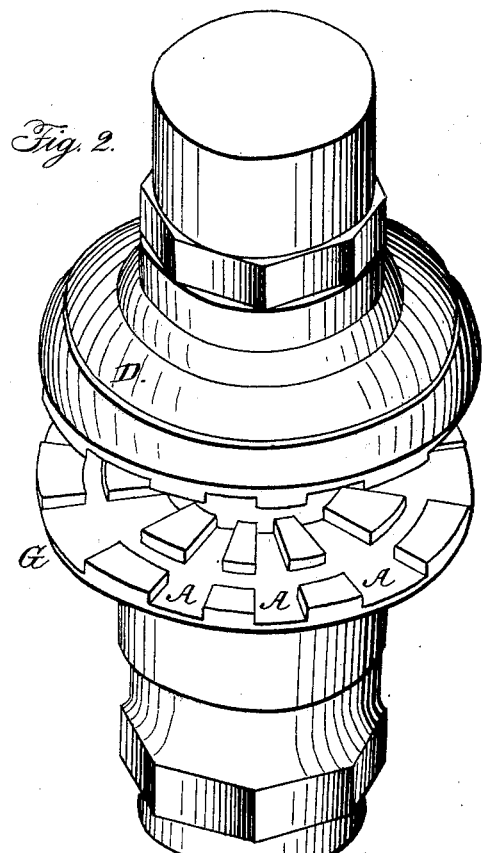
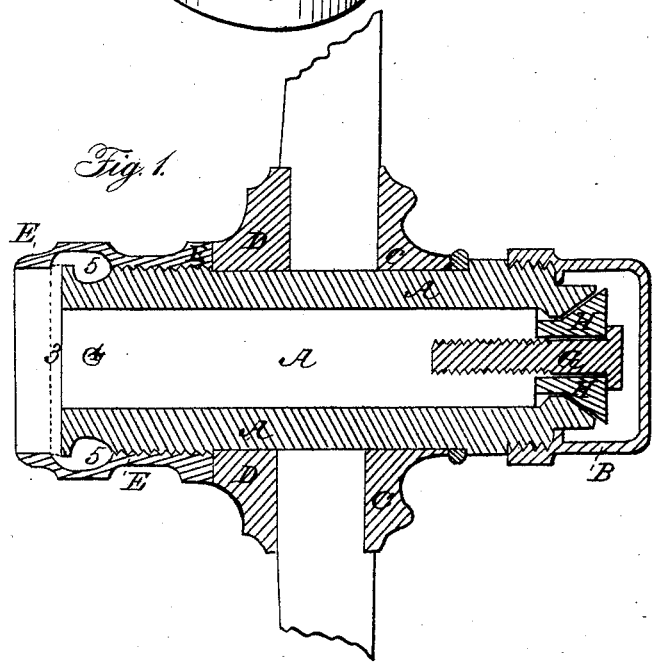

UNITED STATES PATENT OFFICE.

N. T. EDSON, OF NEW ORLEANS, LOUISIANA.

METALLIC HUB FOR CARRIAGE-WHEELS.

Specification of Letters Patent No. 30,395, dated October 16, 1860.

*To all whom it may concern:*

Be it known that I, N. T. EDSON, of New Orleans, parish of Orleans, and State of Louisiana, have invented certain new and useful Improvements in Metallic Hubs for Wheels of Carriages and other Vehicles, of which the following is a full, clear, and exact description, reference being had to the accompanying drawings, forming part of this specification, in which—

Figure 1, represents a longitudinal sectional elevation of a hub embracing my improvements, with part of the spokes placed therein. Fig. 2, represents a perspective view of the same.

My improvements in hubs relate to that class of metallic hubs, in which the spokes are clamped between two flanches, by means of a screw nut turning on the pipe bar of the hub. The objections to this class of hubs are that, in some instances they have been constructed, with no means of support to the spokes to keep them in proper position in the hub, except the pressure of smooth flanches against their edges. In other instances the sides of the tenons of the spokes are separated, by means of deep radial projections formed on and around the adjacent faces of the two flanches, their edges when clamped together coming in contact with the faces of the opposite flanch, and form sockets in which the tenons of the spokes are made to fit and are thus confined between the projections on one flanch, and those on the opposite flanch. In the first mode, the whole surface of the side of the tenon of the spokes resting against each other, the wheel on being put to use, is liable to force the spokes from their centers and the whole structure become a wreck. In the other mode, the tenons of the spokes being entirely inclosed with metal, having no elasticity, are liable to work and become loose in the hub.

The object of my improvements in this class of hubs, is to overcome these defects, and these, I propose by clamping and securing the spokes to the hub, by peculiar formed grooves on the flanches, so constructed, that they will allow, the largest surface of the faces, or sides of the tenon of each spoke to adjoin continuously around the hub, at the same time hold each spoke separately, and combined, without filling the spokes except to a uniform size, thus overcoming a great objection in former modes of securing spokes between the flanches of the hub.

By reference to the accompanying drawings, it will be seen, that the nature of my invention for effecting these objects, consists in forming shallow radial grooves A A A on and around the adjacent faces of the flanches C, and D, the form of which grooves will depend on the number of spokes used for the wheel, their depth usually from one to three eighths of an inch, according to the size of the spokes. Sixteen and eighteen spokes are the usual desirable number, the larger number for back, and the less, for front wheels. On selecting the number of spokes to be used in the hub these tenons being of a uniform and proper taper, to allow their faces or sides to adjoin continuously around a circle, the diameter of the pipe bar to be used in the wheel, and so placed on the material, of which the pattern for the flanch is to be made every alternate spoke will be removed, and the remaining half be cut into the material, the depth desired for the spokes to dodge each other. The same pattern as far as the form of groove applies, will answer both flanches. Both flanches are movable on the pipe bar A, one of them resting against a shoulder, formed on the bar, and both provided with grooves A, A, A, which grooves and projections are of the same form, size, and depth. The projections which form the grooves on one flanch are placed opposite to the grooves on the other flanch, so that the entire width of each spoke, except so much as enters one groove, rests against its adjoining spokes, and is by them held as firmly in its place, as if both edges of the spokes entered grooves in the flanches. The pipe bar A, the flanches C, and D, and the screw nut E, form the hub complete. A cap B, screws on the end of the pipe bar, and serves as an oil cup to convey oil over a cone nut, to the axle, when in use.

Having thus fully described my invention what I claim as new, and desire to secure by Letters Patent is—

So constructing, the two metallic flanches C, and D, which are provided with grooves A A A and projections as represented, that they will clamp and hold the spokes separate and distinct from each other on their edges, while they are allowed to bear and press against each other on their faces, forming a wheel of dodged spokes, substantially as and for the purpose specified.

N. T. EDSON.

Witnesses:
B. B. HOTCHKISS,
R. DEARIE.